May 7, 1968   HIROSI HIRAKAWA   3,381,549
SPEED CHANGE DEVICE
Filed Jan. 10, 1966
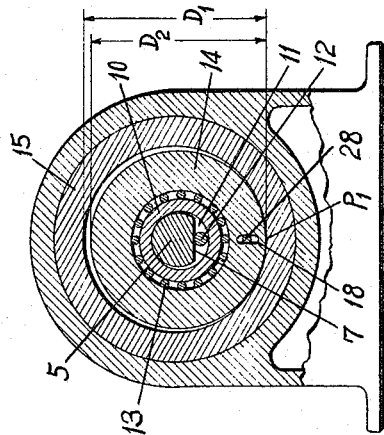
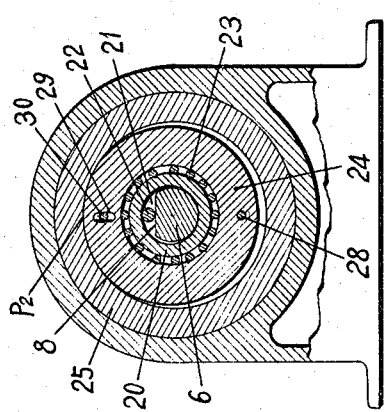
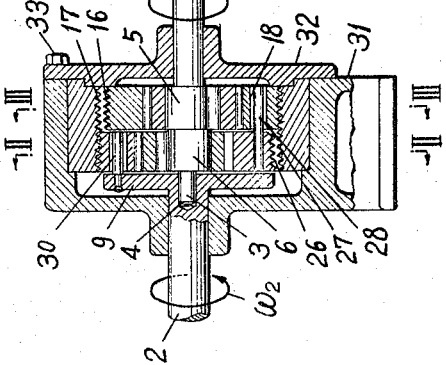
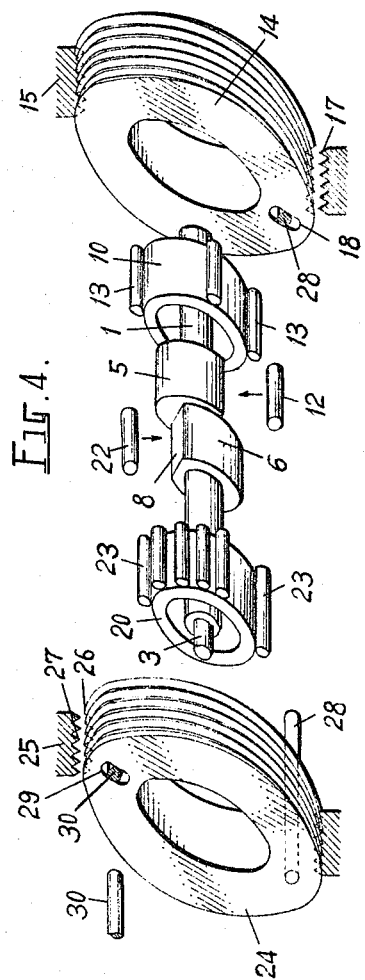
INVENTOR.
HIROSI HIRAKAWA
BY
Kimmel, Crowell & Weaver
ATTORNEYS.

3,381,549
SPEED CHANGE DEVICE
Hirosi Hirakawa, 4–16 Kodan-jutaku, Shimokurata,
Totsuka-ku, Yokohama-shi, Japan
Filed Jan. 10, 1966, Ser. No. 519,676
Claims priority, application Japan, Jan. 13, 1965,
40/1,861
1 Claim. (Cl. 74—804)

ABSTRACT OF THE DISCLOSURE

A hypocyclic speed reduction device which includes a driven shaft having a disc formed on the end thereof and a concentric opening in said end, a drive shaft having its end portion received in the opening of the driven shaft and including a pair of unitarily formed oppositely disposed eccentric shaft portions each of which has a flat side thereon, an idler wheel on each shaft portion, a loosely fitted roller between the flat portion and the idler wheel, a plurality of roller bearings supporting a roller concentric with each idler wheel, each roller having a grooved surface of a high frictional material and a fixed wheel concentric with both the drive shaft and the driven shaft having a plurality of grooves therein for receiving on opposite sides thereof the outer periphery of each of the roller wheels is disclosed.

---

The present invention relates to improvements in a speed change device for use in general machines and more particularly to a speed change device which is adapted to be used between a driving shaft and a driven shaft opposed to each other along a straight line.

An object of the present invention is to provide a speed change device which is compact and yet has a high speed change ratio between a driving shaft and a driven shaft disposed along a straight line.

FIG. 1 is a longitudinal cross-section view of the speed change device according to the present invention, FIG. 2 is a transverse cross-section view of the device in FIG. 1 taken along the line II—II, FIG. 3 is a transverse cross-section view of the device in FIG. 1 taken along the line III—III, and FIG. 4 is a perspective view of the details of the essential part of the device according to the present invention.

A driving shaft 1 and a driven shaft 2 are disposed along the same straight line, so that a projecting shaft 3 at the extreme end of the driving shaft 1 may be rotatably fitted in a bearing bore 4 at the extreme end of the driven shaft 2. Integrally with the driving shaft 1 are formed eccentric shafts 5 and 6, the phases of which are displaced from each other by 180° in the direction of their rotation, and on the surface of the respective eccentric shafts 5, 6 are formed flat portions 7, 8 the phase of which are also displaced from each other by 180° in the direction of rotation of the eccentric shafts 5, 6. A flange 9 is formed at the end of the driven shaft 2. Outside of the eccentric shaft 5 is loosely fitted an idle wheel 10, and within the crescent-shaped gap formed by the idle wheel 10 and the flat portion 7 of the eccentric shaft 5 is loosely fitted a roller 12. Surrounding the outer periphery of the idle wheel 10 is rotatably fitted a rolling wheel 14 by the intermediary of a roller bearing 13, and outside of the rolling wheel 14 is disposed an inscribing fixed wheel 15 in a concentric relation to the driving shaft 1. The diameter $D_2$ of the pitch circle of the rolling wheel 14 is made somewhat smaller than the diameter $D_1$ of the pitch circle of the inscribing fixed wheel 15, the outer periphery of the rolling wheel 14 being made to frictionally contact with the inner periphery of the inscribing fixed wheel 15 at a single point $P_1$, and along the outer periphery of the rolling wheel 14 and the inner periphery of the inscribing fixed wheel 15 are formed ring-shaped ridges 16, 17 respectively which engage with each other and which portions are made of materials having a high coefficient of friction such as, for example, rubber, synthesized resins, etc.

On the other hand, outside of the eccentric shaft 6 is loosely fitted an idle wheel 20, and within the crescent-shaped gap space formed by the idle wheel 20 and the flat portion 8 of the eccentric shaft 6 is loosely fitted a roller 22. Surrounding the outer periphery of the idle wheel 20 is rotatably fitted a rolling wheel 24 by the intermediary of a roller bearing 23, and outside of the rolling wheel 24 is disposed an inscribing fixed wheel 25 in a concentric relation to the driving shaft 1. The diameter $D_2$ of the pitch circle of the rolling wheel 24 is made somewhat smaller than the diameter $D_1$ of the pitch circle of the inscribing fixed wheel 25, the diameter $D_2$ of the pitch circle of the rolling wheel 24 being made equal to the diameter $D_2$ of the pitch circle of the rolling wheel 14, the diameter $D_1$ of the pitch circle of the inscribing fixed wheel 25 being made equal to the diameter $D_1$ of the pitch circle of the inscribing fixed wheel 15, and the pitch circle of the rolling wheel 24 is made to frictionally contact with the pitch circle of the inscribing fixed wheel 25 at a single point $P_2$. Along the outer periphery of the rolling wheel 24 and the inner periphery of the inscribing fixed wheel 25 are formed ring-shaped ridges 26, 27 respectively which engage with each other.

An elongated hole 18 in the radial direction is drilled in the rolling wheel 14 and into this hole is loosely fitted a pin 28 which projects from the other rolling wheel 24. Also an elongated hole 29 in the radial direction is drilled in the rolling wheel 24 and into this hole is loosely fitted a pin 30 which projects from the flange 9. All the above-described components except for the driving shaft 1 and the driven shaft 2 are encompassed in a casing 31, which is in turn sealed by means of a cover plate 32 and bolts 33.

When the driving shaft 1 rotates at an angular velocity $\omega_1$ in the direction shown by the arrow $\omega_1$, the driven shaft 2 is rotated at an angular velocity $\omega_2$ in the direction shown by the arrow $\omega_2$. Upon rotation of the driving shaft 1, the eccentric shafts 5, 6 formed integrally therewith also rotates in an eccentric manner. When the eccentric shaft 5 makes an eccentric motion within the idle wheel 10, the roller 12 is pinched between the flat portion 7 and the idle wheel 10, so that the idle wheel 10 is forced towards the point $P_1$ in proportion to its driven resistance and thus the idle wheel 10 makes an eccentric motion together with the eccentric shaft 5, that is, the idle wheel 10 makes a revolution. Then the rolling wheel 14 starts a rotation since it frictionally contacts with the inscribing fixed wheel at the point $P_1$.

The above-described rotation will similarly occur for the other rolling wheel 24, and the both rolling wheels 14, 24 rotate in a ganged manner by means of the pin 28 so that the resultant torque may be transmitted to the driven shaft 2 by the intermediary of the pin 30. In more particular, since the pin 30 is fitted in the elongated hole 29, the flange 9 also starts its rotation, and thus the driven shaft 2 integrally formed therewith is brought into rotation.

If the angular velocity of the driving shaft 1 is represented by $\omega_1$, the angular velocity of the driven shaft 2 as well as the rolling wheels 14, 24 by $\omega_2$, the diameter of the pitch circle of the inscribing fixed wheel 15 by $D_1$, the diameter of the pitch circle of the rolling wheel 14 by $D_2$, and the speed change ratio of $\omega_2$ to $\omega_1$, by $i$, then the following mathematical relation may be obtained:

$$i = \frac{\omega_2}{\omega_1} = -\frac{D_1 - D_2}{D_2} \qquad (1)$$

where the negative sign (−) represents the fact that the rotations of $\omega_1$ and $\omega_2$ are opposed in the direction to each other. According to the Equation 1, if one selects the difference between the diameter $D_1$ of the pitch circle of the inscribing fixed wheel 15 and the diameter $D_2$ of the pitch circle of the rolling wheel 14 to have a value equal to $\frac{1}{10} \sim \frac{1}{100}$ of the pitch circle of the rolling wheel, that is, of $D_1 - D_2 = (\frac{1}{10} \sim \frac{1}{100})D_2$, then the speed change ratio $i$ takes a value equal to $\frac{1}{10} \sim \frac{1}{100}$, and thus a high speed change ratio may be obtained by means of a simple mechanism.

What is claimed is:

1. A speed change device which comprises:

a driven shaft having a concentric opening on one end and a disc formed on said one end;

a drive shaft having a first diameter and a reduced diameter end portion, said reduced diameter end portion being received in the opening in the driven shaft, said drive shaft having two integrally formed eccentric shaft portions, said shaft portions being eccentric on opposite sides of the axis of the drive shaft and including a flat surface portion on a substantially circular shaft portion, said flat surface portion being on said opposite sides of the shaft axis;

an idle wheel received on each eccentric shaft portion, said idle wheel having a greater internal diameter than the diameter of the respective shaft portions;

a roller loosely fitted in the space between the flat surface portion of each shaft portion and the idle wheel;

a rolling wheel concentrically disposed witth each idle wheel, said rolling wheel including a plurality of parallel generally V-shaped grooves formed in the outer periphery thereof, portions of said grooves being formed of material having a high coefficient of friction;

a plurality of roller bearings rotatably supporting each rolling wheel respectively on the respective idle wheel;

a fixed wheel concentrically disposed relative to the common axis of the driving and driven shafts, said fixed wheel having a grooved inner periphery, said inner periphery being in engagement with the outer periphery of each of the rolling wheels, said wheels engaging the fixed wheel on opposite sides;

a pin fixedly secured in one rolling wheel and extending into a radially elongate opening in the other rolling wheel; and a pin fixedly secured to the disc and extending into a radially elongate opening in the one rolling wheel.

References Cited

UNITED STATES PATENTS

| | | | |
|---|---|---|---|
| 734,922 | 7/1903 | Metcalf | 287—52.09 |
| 883,559 | 3/1908 | McGregor | 287—52.09 |
| 885,354 | 4/1908 | Loguin | 74—798 |
| 1,788,891 | 1/1931 | Runge | 287—52.09 |
| 1,861,088 | 5/1932 | Hamel | 192—44 |
| 1,910,777 | 5/1933 | Soddy | 74—804 |
| 2,293,407 | 8/1942 | Schirrmeister | 74—804 X |
| 2,697,016 | 12/1954 | Spurgeon | 287—52.09 |
| 3,073,184 | 1/1963 | Braren | 74—804 |
| 3,160,032 | 12/1964 | Black | 74—804 |

FOREIGN PATENTS 821,291  11/1951  Germany.

FRED C. MATTERN, JR., *Primary Examiner.*

THOMAS C. PERRY, *Examiner.*